United States Patent Office 3,453,217
Patented July 1, 1969

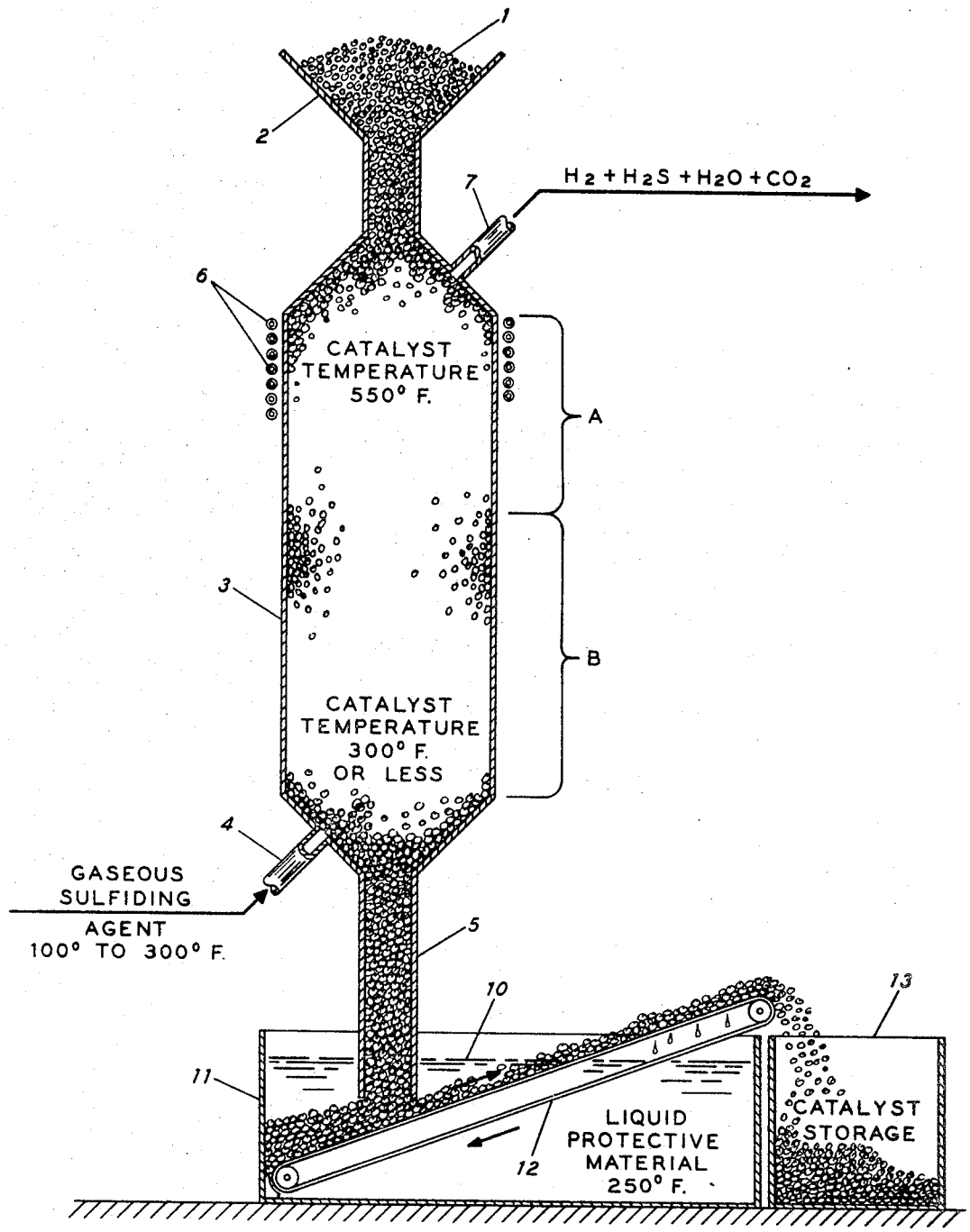

3,453,217
PROTECTION OF SULFIDED HYDROTREATING CATALYSTS AGAINST REACTION WITH OXYGEN
Robert H. Kozlowski, Berkeley, and Bernard F. Mulaskey, Pinole, Calif., assignors to Chevron Research Company, San Francisco, Calif., a corporation of Delaware
Filed Dec. 16, 1966, Ser. No. 602,206
Int. Cl. B01j 11/82
U.S. Cl. 252—430                               1 Claim

ABSTRACT OF THE DISCLOSURE

Preparing of a hydrotreating process catalyst comprising alumina and at least one Group VI metal sulfide hydrogenating component, and at least one Group VIII metal sulfide hydrogenating component, which comprises protecting said metal sulfides against reaction with oxygen by introducing into liquid form into the pores of said catalyst a hydrocarbon protective material before exposure of said catalyst to an oxygen-containing atmosphere has caused more than 5 weight perecent of said metal sulfides to be converted to other compounds.

INTRODUCTION

This invention relates to hydrotreating catalysts, more particularly to sulfided hydrotreating catalysts, that is, hydrotreating catalysts comprising at least one metal sulfide, and still more particularly to a method for the protection of such catalysts against reaction with oxygen.

PRIOR ART PROBLEMS

The present invention is particularly concerned with sulfided hydrotreating catalysts comprising a component selected from the group consisting of alumina and silica-alumina, said component when silica-alumnia having a silica:alumina ratio of 1:99 to 90:10 and comprising at least one hydrogenating component, the total hydrogenating component weight being more than 20% of the entire catalyst, said catalyst not having been subjected during manufacture thereof to a heat treatment at a temperature above about 1050° F. Representative of such catalysts are hydrofining catalysts comprising nickel sulfide and molybdenum sulfide or tungsten sulfide in association with an alumina support, and hydrofining-hydrocracking catalysts comprising nickel sufide and molybdenum sulfide or tungsten sulfide in association with a silica-alumina support containing from 1 to 40 weight percent silica. It is known that such sulfided catalysts are pyrophoric, and so present storage problems when it is desired to store them for an extended period of time between their manufacture and their use in hydrotreating processes. Because of their pyrophoric nature they can react exothermically with oxygen in the atmosphere when exposed to the atmosphere, to the extent that a fire hazard can result. The exothermic reaction occurs between the metal sulfides and the oxygen, and even if it does not occur to the extent of creating a fire hazard, it occurs at least to the extent of causing the generation of noxious fumes including sulfur dioxide. It is known to protect such sulfided catalysts against attack by oxygen in the atmosphere by such expedients as keeping them under blankets of inert gas such as $CO_2$ or nitrogen, by keeping them in closed drums, and by keeping the drums full. However, such expedients not only are unwieldy, but do not afford protection during the time when it is needed most, that is, when the catalyst is being transferred from storage drums into a hydrotreating reactor vessel.

It is also known, in U.S. Patent 2,842,504 to apply to pyrophoric nickel metal hydrogenation catalysts a coating of a rubbery polymer, to make the catalyst free flowing and to protect it against loss of activity caused by reaction of the nickel metal with oxygen. Although said Patent 2,842,504 discloses that molybdenum sulfide can be used as a catalyst for the hydrogenation of certain polymers, the patent does not disclose that its method of protecting hydrogenation catalysts is applicable to a sulfided catalyst. Further, the polymer coating disclosed in said patent as a solution to the problems besetting nickel metal catalysts not only is a different solution than the one involved in the process of the present invention but would not achieve the results achieved by the process of the present invention even if applied to the different catalysts with which the process of the present invention is concerned. For example, a polymer coating on catalyst particles would protect the particles from attack by oxygen only if it did not become perforated.

OBJECTS

In view of the foregoing it is an object of the present invention to provide a process for protecting, against reaction with oxygen, sulfided hydrotreating catalysts comprising alumina and at least one hydrogenating component, which does not involve coating the catalysts with a polymer film that can be perforated or ruptured.

DRAWING

The invention will best be understood and further objects and advantages thereof will become apparent from the following description when read in connection with the accompanying drawing which is a diagrammatic illustration of the apparatus, suitable for use in carrying out the process of the present invention.

STATEMENT OF INVENTION

In accordance with the present invention there is provided the method of preparing for use in a hydrotreating process a catalyst comprising a component selected from the group consisting of alumina and silica-alumina, said component when silica-alumina having a silica:alumina ratio of 1:99 to 90:10, and comprising at least one Group VI hydrogenating component and at least one Group VIII hydrogenating component, the total hydrogenating component weight being more than 20% of the entire catalyst, which comprises sulfiding said catalyst to produce a catalyst comprising metal sulfides, and protecting said metal sulfides against reaction wtih oxygen by introducing in liquid form into the pores of said catalyst comprising metal sulfides a protective material consisting essentially of hydrocarbons boiling in the range 410° to 1200° F., before exposure of said catalyst comprising metal sulfides to an oxygen-containing atmosphere has caused more than 5 weight percent of said metal sulfides to be converted to other compounds.

In contrast with prior art protective polymer coatings which have been applied to the exterior macrosurfaces of catalyst particles primarily as a protection against attrition from those exterior macrosurfaces or as a protection against the reaction of oxygen with nickel metal constituents of the catalyst particles the protective material of the process of the present invention is introduced into the catalyst micropores. The ultimate purpose of the protective material of the process of the present invention is to function as a film coating at least a substantial portion of the walls of at least a substantial portion of the micropores of the catalyst. Accordingly, the purposes of the invention are achieved: (a) if a substantial portion of the micropores of the catalyst is filled with the protective material; or (b) if after draining the catalyst of a portion of the protective material another portion thereof remains as a protective film coating a substantial portion of the walls of the catalyst micropores, or (c) if a substantial portion of the micropores of the catalyst is filled with a solution of said protective material in a volatile solvent and if the solvent is evaporated leaving a film of said protective material as a coating on a substantial portion of the walls of the catalyst micropores.

CATALYSTS WHICH MAY BE PROTECTED

The hydrofining and hydrofining-hydrocracking catalysts which may be protected according to the process of the present invention comprise a component selected from the group consisting of alumina and silica-alumina, said component when silica-alumina having a silica:alumina ratio of 1:99 to 90:10 and comprising at least one hydrogenating component, preferably including a Group VI and a Group VIII hydrogenating component, the total hydrogenating component weight being more than 20% of the entire catalyst. The catalysts will not have been previously subjected to a heat treatment at a temperature in excess of about 1050° F. The catalysts when contacted with the protective material in accordance with the process of the present invention will be in the sulfide form, that is they will have been sulfided and therefore will comprise metal sulfides which if allowed to come in contact with oxygen in the atmosphere will react therewith.

Representative hydrofining and hydrofining-hydrocracking catalysts, provided they meet the above requirements, that are especially suitable candidates for protection according to the process of the present invention include catalysts comprising the following components:

| Hydrogenating component(s), in sulfide form: | Component comprising alumina |
|---|---|
| Nickel-molybdenum | Alumina |
| Nickel-molybdenum | Silica-Alumina |
| Nickel-tungsten | Alumina |
| Nickel-tungsten | Silica-Alumina |
| Nickel-tungsten-titanium | Silica-Alumina |
| Nickel-tungsten-zirconia | Silica-Alumina |
| Nickel-tungsten-tin | Silica-Alumina |

The catalysts may be prepared by any conventional method, for example, impregnation, coprecipitation or cogellation.

PROTECTIVE MATERIAL AND ITS APPLICATION

The protective material used in the process of the present invention consists essentially of hydrocarbons, including substituted hydrocarbons such as stearic acid. The protective material boils in the range 410° to 1200° F., preferably 700° to 1100° F. Preferably it is a normally liquid hydrocarbon, including dodecane, catalytic cycle oils, and 700° to 1100° F. straight run petroleum distillates. However, it may also be a normally solid paraffin wax or microcrystalline wax. Good results have been obtained with paraffin waxes, such as the one described in Example 1, below, although microcrystalline waxes, for example those having a melting point around 160° F. and a flash point around 500° F. are preferred waxes. The protective material must not be a solid at temperatures above 700° F., preferably not a solid at temperatures above 550° F., and still more preferably not a solid at temperatures above 200° F.

During impregnation of the catalyst with the protective material the latter preferably will be at a temperature at which its viscosity is low enough to permit impregnation of the catalyst pores to occur at a reasonable rate.

The catalyst preferably is impregnated with the protective material by immersing the catalyst in a liquid body of the protective material. Although it is within the scope of the process of the present invention for the protective material to substantially or completely fill all of the catalyst pores thereby displacing gases from the pores and preventing re-entry of gases into the pores, such substantial or complete filling requires more protective material than is necessary. The amount of protective material required can be reduced by combining it with a low boiling solvent, filling the catalyst pores with the solution of protective material and solvent and evaporating the solvent, thereby leaving a coating of the protective material on the interior walls of the catalyst pores. For example, when dodecane is used as the protective material it may be dissolved in a hexane solvent, the solution may be used to fill the catalyst pores and the hexane may be evaporated leaving the interior walls of the catalyst pores coated with dodecane. The amount of protective material used can also be reduced by dipping the catalyst in a liquid body of the protective material for an insufficient time for the liquid to completely fill the catalyst pores. Normally the catalyst pores would be completely filled after the catalyst had been immersed in the liquid body of protective material for approximately 15 minutes to ½ hour. If the catalyst is removed from the liquid body of protective material before the pores are completely filled therewith, the material will gradually cover the interior walls of the catalyst pores thereby providing excellent protection without using the maximum amount of protective material.

It will be appreciated that one of the main advantages of the process of the present invention is to permit sulfided hydrofining and hydrofining-hydrocracking catalysts of the type with which the present invention is concerned to be protected outside of a reactor against attack by oxygen, stored in drums for extended periods of time, and loaded into reactors slowly and carefully when needed, without concern that contact with oxygen in the atmosphere during the loading procedure will cause noxious fumes and/or pyrophoric reactions.

The protective material at the time of its application to the catalyst preferably will be at a temperature of at least 200° F. It will be appreciated that contrary to some prior art processes which disclose contacting a hydrocracking catalyst in a reactor with hydrogen and a liquid hydrocarbon at a low temperature and then raising the temperature to reaction temperature while continuing the flow of hydrogen and hydrocarbon, the process of the present invention involves contacting a hydrofining or hydrofining-hydrocracking catalyst outside the reactor with a protective material at an elevated temperature, in the absence of hydrogen, and then cooling the protected catalyst and storing it until its transfer to a reactor is desired.

EXPOSURE OF CATALYSTS TO OXYGEN AFTER PROTECTION, AND LOADING OF CATALYSTS INTO REACTOR

As will be even more apparent from the examples below following protection of sulfided hydrofining or hydrofining-hydrocracking catalysts in accordance with the process of the present invention they may be stored for long periods of time exposed to oxygen in the atmosphere which exposure heretofore would have been expected to cause noxious fumes, including sulfur dioxide, and even to cause pyrophoric reactions sufficient to create a fire hazard. The treating catalysts no longer need to be stored in sealed drums. Transfer from storage drums to reactor no longer need be extremely rapid, to minimize contact of the catalyst with oxygen in the atmosphere.

USE OF PROTECTED CATALYSTS FOR HYDROFINING OR HYDROFINING-HYDROCRACKING REACTIONS

The catalysts protected in accordance with the process of the present invention may be used in conventional hydrofining or hydrofining-hydrocracking service, for example, in the hydro-treatment of petroleum distillates and residual stocks at temperatures from 450° to 850° F., pressures in the range 500 to 3500 p.s.i.g. and space velocities in the range 0.1 to 10.0 in the presence of 500 to 30,000 s.c.f. of hydrogen per barrel of feed.

The following examples will further illustrate the process of the present invention.

Example 1

A hydrofining-hydrocracking catalyst having the following composition was prepared:

| | Weight percent |
|---|---|
| NiO | 7.5 |
| $MoO_3$ | 24.0 |
| $SiO_2$ | 16.5 |
| $Al_2O_3$ | 52.0 |
| Total | 100.0 |

The catalyst was prepared in a conventional manner by impregnation of ³⁄₃₂" diameter by ³⁄₁₆" long cylindrical particles of a silica-alumina support with a solution comprising salts of nickel and molybdenum, followed by drying and calcination during which the metal salts were converted to metal oxides.

The catalyst particles so prepared were subjected to a conventional sulfiding treatment with dimethyl disulfide in admixture with hydrogen.

Example 2

Immediately after sulfiding, a portion of the catalyst particles prepared in Example 1 was cooled in a dry, oxygen-free atmosphere to about 300° F. and immersed, without having been in contact with oxygen after sulfiding, in a body of liquid paraffin wax having a temperature of about 250° F. The paraffin wax had the following composition:

| | |
|---|---|
| Melting point, ° F. (approx.) | 128 |
| Aniline point, ° F. | 245 |
| Flash point, ° F. | 390 |
| Molecular weight (approx.) | 350 |

During immersion in the body of paraffin wax, a portion wax, a portion of the wax displaced gases from the pores in the catalyst particles, and these gases were observed to bubble upwardly through the body of paraffin wax for a period of approximately 15 minutes. The cessation of this bubbling indicated that the maximum obtainable displacement of gases in the catalyst particle pores by the wax had been completed. The catalyst particles were then removed from the body of paraffin wax, drained of excess wax on the exterior macrosurfaces of the particles, cooled to room temperature and stored in a closed, covered container in an atmosphere of air.

After the catalyst particles had been stored as aforesaid for a period of one year they were examined. They showed no tendency to be pyrophoric, and no odor, indicating that they had been and remained essentially completely protected by the paraffin wax from oxygen in the atmosphere.

Example 3

Another portion of the sulfided catalyst particles prepared in Example 1 was cooled, immediately after sulfiding, to about 300° F. in a dry, oxygen-free atmosphere and immersed, without having been in contact with oxygen after sulfiding, in a body of liquid dodecane, rather than paraffin wax, at a temperature of about 250° F. As in Example 2, gases from the catalyst particle pores were observed to bubble upwardly through the body of liquid dodecane for approximately 15 minutes. The catalyst particles were then removed from the body of liquid dodecane, drained of excess liquid dodecane on the exterior macrosurfaces of the particles, cooled to room temperature and stored in a closed, covered container in an atmosphere of air. After the catalyst particles had been stored as aforesaid for a period of one year they were examined. They showed no tendency to be pyrophoric and no odor indicating that they had been and remained essentially completely protected by the liquid dodecane from oxygen in the atmosphere.

DISCUSSION OF DRAWING

Referring now to the drawing, there shown is a diagrammatic illustration of apparatus suitable for carrying out the process of the present invention. A mass 1 of particles of unsulfided catalyst, for example comprising 7.5 weight percent nickel oxide, 24.0 weight percent molybdenum trioxide, 16.5 weight percent silica and 52.0 weight percent alumina, is passed from hopper 2 into sulfiding reactor vessel 3, where it is sulfided in an upper zone A thereof at a temperature of 500° to 700° F. as it descends through reactor vessel 3 in countercurrent contact with a rising gaseous sulfiding agent introduced at a temperature of 100° to 300° F. into reactor vessel 3 through line 4. As the downwardly moving sulfided catalyst particles pass from zone A through zone B they are cooled by heat exchange with the rising gaseous sulfiding agent to a temperature of 300° F. or less, after which they pass from reactor vessel 3 through catalyst outlet 5. The temperature of sulfiding zone A is maintained at the desierd level by heating coils 6. Gaseous materials, including hydrogen, hydrogen sulfide, water vapor and carbon dioxide are removed from the upper portion of sulfiding zone A through line 7. The gaseous sulfiding agent may be, for example, a mixture of hydrogen sulfide with hydrogen or carbon dioxide. It is preferable to maintain the partial pressure of hydrogen sulfide at a low level so that the partial pressure of water vapor in sulfiding reactor vessel 3 will be maintained at a low level, to minimize any possible adverse effect of water vapor on the activity of the catalyst.

From catalyst outlet 5 the sulfided catalyst particles pass into a liquid body 10 of protective material, contained in container 11, and on to moving belt screen 12, moving in the direction shown to carry the protected catalyst particles out of liquid body 10 into catalyst storage container 13. As the catalyst particles emerge on moving belt screen 12 from liquid body 10 excess liquid protective material drains down and through belt 12 back into liquid body 10.

Numerous changes could be made in the specific materials, apparatus, techniques and procedures discussed above without departing from the spirit of the invention; accordingly, it is intended that all such changes not specifically excluded by the language of the following claim are encompassed thereby.

What is claimed is:

1. The method of preparing for use in a hydrotreating process a catalyst comprising a component selected from the group consisting of alumina and silica-alumina, said component when silica-alumina having a silica:alumina ratio of 1:99 to 90:10, and comprising at least one Group VI hydrogenating component and at least one Group VIII hydrogenating component, the total hydrogenating component weight being more than 20% of the entire catalyst, which comprises sulfiding said catalyst to produce a catalyst comprising metal sulfides, and protecting said metal sulfides against reaction with oxygen by introducing in liquid form into the pores of said catalyst comprising metal sulfides a protective material consisting essentially of hydrocarbons boiling in the range 410° to 1200° F., before exposure of said catalyst comprising metal sulfides to an oxygen-containing atmosphere has caused more than 5 weight percent of said metal sulfides to be converted to other compounds.

References Cited

UNITED STATES PATENTS

| | | | |
|---|---|---|---|
| 1,390,683 | 9/1921 | Ellis | 252—430 |
| 2,240,347 | 4/1941 | Page et al. | 23—288.36 |
| 2,600,425 | 6/1952 | Parry | 23—277 |
| 3,324,045 | 6/1967 | Mason | 252—439 |

PATRICK P. GARVIN, *Primary Examiner.*

C. F. DEES, *Assistant Examiner.*

U.S. Cl. X.R.

252—439, 455, 458, 459